March 17, 1942. L. M. HEADLEY 2,276,392
PROJECTOSOPE SLIDES AND METHOD OF PROJECTING THEIR IMAGES
Filed Dec. 13, 1939 2 Sheets-Sheet 1
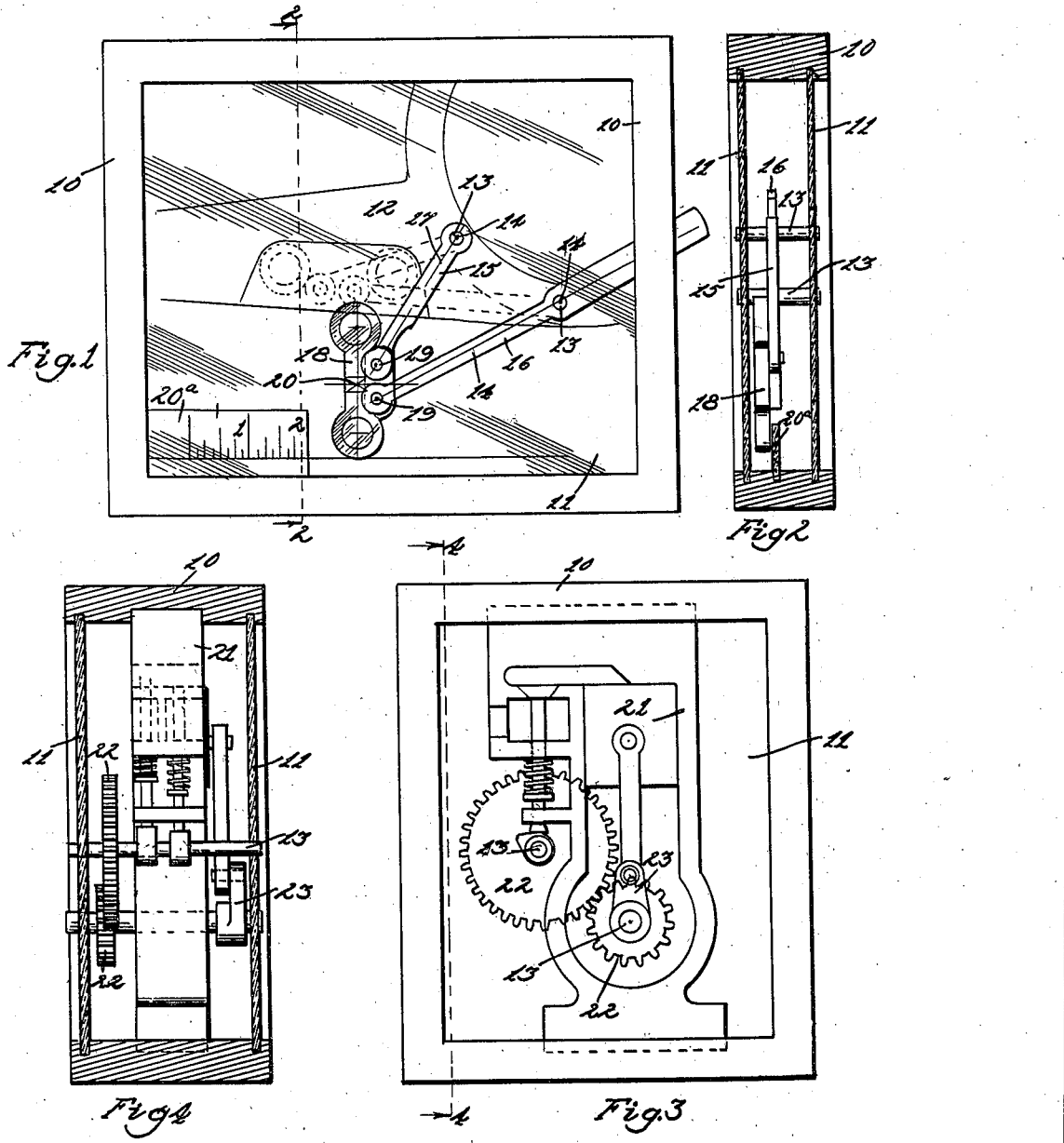

March 17, 1942.  L. M. HEADLEY  2,276,392
PROJECTOSOPE SLIDES AND METHOD OF PROJECTING THEIR IMAGES Filed Dec. 13, 1939  2 Sheets-Sheet 2

Inventor
Lewis M. Headley
by Craig E. Hague
Atty's

Patented Mar. 17, 1942

2,276,392

UNITED STATES PATENT OFFICE 2,276,392

PROJECTOSCOPE SLIDE AND METHOD OF PROJECTING ITS IMAGE

Lewis M. Headley, Ames, Iowa

Application December 13, 1939, Serial No. 309,027

2 Claims. (Cl. 88—26)

My invention relates to the use of a projectoscope for displaying upon a screen an enlarged representation of an object carried by a slide.

The object of my invention is to provide an apparatus and method whereby an object, such for instance as a piece of machinery having overlapping and relatively movable elements, may be projected in enlarged form upon a screen, with all parts visible at the same time and with the same relative proportions, so that accurate measurements may be taken from the image upon a screen when the movable elements are in any position of their relative movements, whereby instructors may employ small and inexpensive models of relatively movable elements and display same in enlarged form upon a screen and demonstrate from the image on the screen the exact relative positions, motions and proportions of the elements, and all parts of each element when in any position of their relative movement.

A further object is to provide an apparatus and method for use in making so-called X-ray drawings in which an element in the front is illustrated as being semi-transparent and an element in the rear thereof is illustrated upon the drawings in its proper relative positions, although it would ordinarily be hidden by the element in front, and I accomplish this object by making a small model in which the overlapping elements are made of transparent material so that all of the elements may be projected upon a screen in enlarged form with each element in its proper relative position to the other elements when in any position of their movement, and whereby a draftsman may simply trace the projected image upon the screen with the elements in front in exact relative size and position to the elements in the rear thereof.

In some instances the model to be projected upon a slide has an element spaced a substantial distance apart from another element in the same line of vision, and it is an object of my invention to project an image thereof upon a screen with both of said parts in their exact relative sizes, without being distorted because of being in different focal planes of the projector.

In the accompanying drawings—

Figure 1 shows an elevation of a slide having movable mechanical elements in overlapping positions;

Figure 2 shows a sectional view of same on the line 2—2 of Figure 1;

Figure 3 shows an elevation of a slide having movable mechanical elements widely spaced apart and in the same line of vision;

Figure 4 shows a sectional view of same on the line 4—4 of Figure 3;

Figures 5, 6:
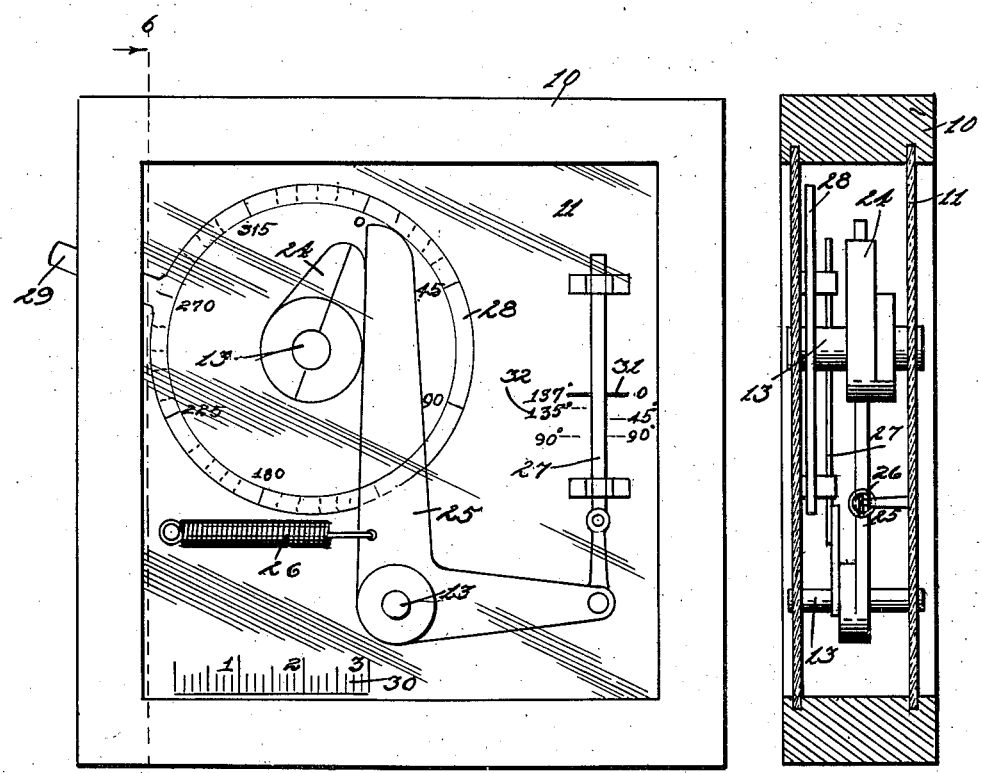
Figure 5 shows an elevation of a slide having movable mechanical elements and a protractor associated therewith, and a scale.
Figure 6 shows a sectional view of same on the line 6—6 of Figure 5.

The slide illustrated in Figures 1 and 2 comprises a frame 10 having two clear transparent walls 11 spaced apart. On one of these walls there is marked the outlines of a portion of an airplane body and wing at 12. This is preferably done by etching. These etched outlines are clearly displayed on the screen by a projectoscope.

Extended through both walls 11 are the bearing shafts 13, also made of transparent material, and at the center of each there is a mark 14 indicating the pivotal center. Pivotally mounted on one of the shafts 13 is a link 15 and on the other a lever 16. The lever 16 is extended beyond the frame for purposes of manual operation. Both the link and lever are made of transparent material and have markings 17 thereon, preferably by etching, indicating a central longitudinal line or other details. Another machine element, 18, shaped like part of an airplane landing gear, is pivotally connected to the link and lever by transparent bearing shafts 19; the link and lever overlap the landing gear 18 and are, therefore, in a different focal plane within the slide. Markings 20 are made upon the landing gear indicating its longitudinal center or other details.

The markings upon the landing gear 18 are etched in the side thereof adjacent the link and lever, and those on the link and lever are on the sides thereof adjacent the landing gear, hence, all of the markings are in the same focal plane of the slide.

For the purpose of emphasizing any certain element I apply transparent color to it, as indicated by the shaded lines on the landing gear in Fig. 1.

For the purpose of utilizing this slide in making accurate measurements upon the image projected upon the screen I have provided a transparent plate 20a having a scale thereon, which scale is in the same focal plane as that of the markings upon the elements.

In the form of slide illustrated in Figures 3 and 4 I have provided a mechanism in which some of the elements are necessarily spaced apart and, hence, are in different focal planes. The elements there shown illustrate portions of an engine, the cylinder 21 being in one plane, the gears 22 being at one side of the cylinder, and the crank 23 being on the opposite side of the cylinder. These elements are like those shown in Figures 1 and 2 made of transparent material, including the shafts, and when projected upon a screen the outlines of each element may be seen.

In the form of slide shown in Figures 5 and 6 I have provided a rotatable cam 24 and a pivoted lever 25 held against the cam by a spring 26 and a slide rod 27 pivoted to the lever 25. Pivotally mounted upon the shaft of the cam 24 is a protractor 28 upon which is marked the degrees of a complete circle. A handle 29 extends beyond the frame whereby the protractor may be rotated. These elements are all made of transparent material. A scale 30 is marked upon one of the transparent walls. A pointer 31 is attached to the rod 27, and markings 32 indicating degrees are placed upon one of the walls adjacent the pointer.

The projectscope 33 is of the ordinary construction.

Figure 7:
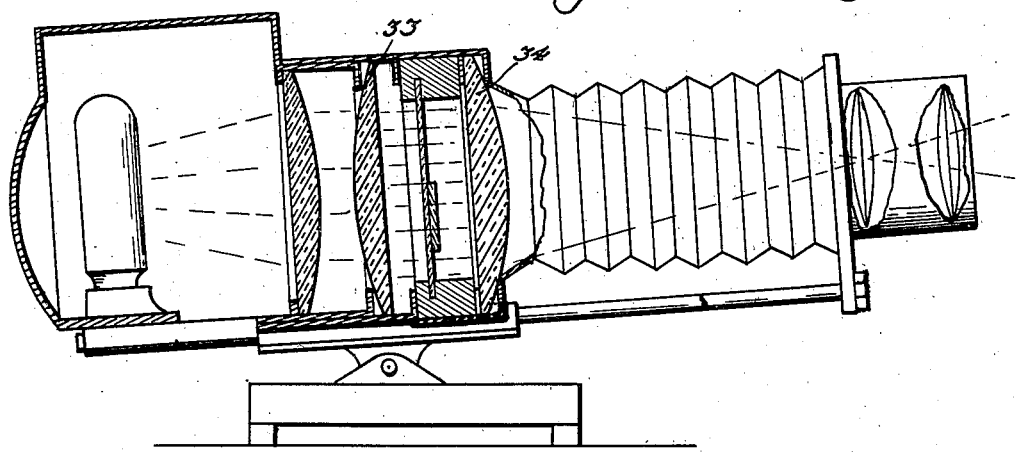
Figure 7 shows a projectoscope, partly in section, and a slide having mechanical elements mounted within the projectoscope.

In Figure 7 I have illustrated detachable lenses 33 and 34 on opposite sides of the slide frame, which lenses have such characters as to direct the rays of light through the slide in parallelism, whereby the elements of the slide which are in spaced apart focal planes are projected upon the screen in their true relative proportions and are not relatively enlarged or reduced.

In practice I have demonstrated that with a single slide containing transparent overlapping movable elements having markings on their adjacent faces, which markings are in a single focal plane, and the use of an ordinary projectoscope, there is displayed upon a screen an image of all of the markings upon the elements within the slide in their exact relative proportions. When the members are moved their exact relative positions and motions are displayed upon the screen.

I have further demonstrated in practice that by adding a scale 20a in the same focal plane as that of the markings upon the elements, accurate relative measurements may be made from the image projected upon the screen of the relative amounts of movement of any part of any element within the slide.

I have further demonstrated in practice that by the use of my method and apparatus I can make so-called X-ray drawings upon the screen by simply tracing the outlines of the markings upon the elements, and that such X-ray traced drawings will show all features of the X-ray drawings in their true relative proportions and positions.

With the slide illustrated in Figures 5 and 6, and using a protractor pivoted to the shaft of a rotatable element, I have demonstrated in practice that the exact degree of inclination of an element when in any position of its movement may be accurately displayed upon a screen, and traced thereon.

In instances when the nature of the elements within the slide requires that they be in spaced-apart positions, in different focal planes, as in Figs. 5 and 6, these elements may be displayed upon a screen in their true relative proportions and positions by the use of lenses for paralleling rays of light passing through the slide.

With a single slide containing overlapping, relatively movable elements, such as the engine parts shown in Figures 3 and 4, I can visually display upon a screen all parts of each element, all of the same relative proportions and relative positions, when the elements are in any position of their relative movement, with such accuracy that comparative measurements may be taken from the projected image upon the screen. Furthermore, accurate tracings may be made upon the screen from the projected image, and accurate motion pictures may be made by photographing the moving images when they are projected upon the screen. If such tracings are made with the elements relatively moved to various positions, accurate comparative measurements may be made from the several tracings. With the use of the scale 30 these measurements may be reduced.

I have used the term "focal plane" of the slide to describe that feature of my invention on which markings are etched in adjacent surfaces of the elements, whereby the markings are brought into the same plane, although the elements are overlapping and, hence, in different planes, and I employ the same term "focal plane" to describe that feature which consists in paralleling the light rays through the slide and thereby providing a single focal plane for all of the overlapping elements within the slide.

I claim as my invention:

1. A slide for projectoscopes, comprising in combination a frame, a series of elements within the frame, one of which is mounted for movement relative to the others, and one of which is in position overlapping the other and being in a different focal plane, said elements being closely adjacent so that their adjacent surfaces are in the same focal plane, markings upon the elements indicating characteristics thereof, said markings being located on the adjacent sides of the elements and being in the same focal plane, and said elements being of transparent material whereby when the image of said elements is projected in enlarged form upon a screen, the relative proportions of the markings will be exactly the same as those of said elements, and a scale marking on transparent material also placed in the same focal plane as the said markings upon said elements, so that when projected upon a screen in enlarged form, the markings of the scale will be inexactly the same relative proportion as the markings upon the said elements and scale.

2. In a projectoscope slide, the combination of a frame, two transparent plates mounted within the frame, portions thereof being in overlapping positions and, hence, in different focal planes relative to the slide, one of said plates being movable within its focal plane relative to the other, markings upon the surface of one of said plates disclosing a portion of an image to be projected, and similar markings on the adjacent side of the overlapping portion of the other plate disclosing another portion of the image to be projected, said markings being of such character as to be visibly projected upon a screen, and whereby the said markings are in the same focal plane during movement of the plates relative to each other and whereby a highly enlarged projected image from the markings on the plate will disclose said markings in their exact relative proportions.

LEWIS M. HEADLEY.